(12) United States Patent
Velur et al.

(10) Patent No.: US 11,481,498 B2
(45) Date of Patent: Oct. 25, 2022

(54) CONTINUOUS VULNERABILITY MANAGEMENT FOR MODERN APPLICATIONS

(71) Applicant: Visa International Service Association, San Francisco, CA (US)

(72) Inventors: Shashi Velur, Austin, TX (US); Abha Sharma, Austin, TX (US); Karthiga Kengan, Austin, TX (US); Keeshini Manivannan, Cedar Park, TX (US); Chintal Vashi, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 942 days.

(21) Appl. No.: 16/259,960

(22) Filed: Jan. 28, 2019

(65) Prior Publication Data
US 2020/0242254 A1 Jul. 30, 2020

(51) Int. Cl.
*G06F 21/57* (2013.01)
*G06F 21/55* (2013.01)
(Continued)

(52) U.S. Cl.
CPC .......... *G06F 21/577* (2013.01); *G06F 21/552* (2013.01); *G06F 21/562* (2013.01); *G06F 9/54* (2013.01)

(58) Field of Classification Search
CPC ..... G06F 21/577; G06F 21/552; G06F 21/562
See application file for complete search history.

(56) References Cited

U.S. PATENT DOCUMENTS

2007/0006222 A1\* 1/2007 Maier ...................... G06F 8/61
717/170
2007/0226256 A1 9/2007 Imai
(Continued)

FOREIGN PATENT DOCUMENTS

WO 2016190883 12/2016

OTHER PUBLICATIONS

Tomasz Gorski • Ewa Wojtach; Use Case API—design pattern for shared data Overview Citations Text; 2018 26th International Conference on Systems Engineering (ICSEng) (pp. 1-8); (Year: 2018).\*
(Continued)

*Primary Examiner* — Jahangir Kabir
*Assistant Examiner* — Chao Wang
(74) *Attorney, Agent, or Firm* — Kilpatrick Townsend & Stockton LLP

(57) ABSTRACT

Apparatuses, methods, and systems are provided for making continuous vulnerability management for modern applications. A dependency tree can be created mapping third-party libraries to microservices used in an application of a software package. Natural language processing can be used on release notes and changelogs of new library versions to generate a list of libraries afflicted with common vulnerabilities and exposures ("CVEs"). A number of code calls from an application program interface ("API") can be made to an afflicted library. A number of code calls including CVEs can be enumerated for each afflicted library. A risk score can be assigned to the API based on the number of code calls including CVEs. The risk score can be compared against a threshold value to cause a remedial action to occur, including updating libraries to newer versions to resolve CVE issues or generating a report regarding the afflicted libraries.

20 Claims, 9 Drawing Sheets

(51) Int. Cl.
    *G06F 21/56*     (2013.01)
    *G06F 9/54*     (2006.01)

(56) References Cited

U.S. PATENT DOCUMENTS

| | | | |
|---|---|---|---|
| 2013/0226975 A1* | 8/2013 | Lee | G06F 16/11 707/821 |
| 2016/0232351 A1* | 8/2016 | Guo | G06F 21/561 |
| 2016/0357967 A1* | 12/2016 | Mulchandani | G06F 21/577 |
| 2018/0069889 A1* | 3/2018 | Beale | H04L 63/1433 |
| 2018/0124110 A1* | 5/2018 | Hunt | G06F 16/951 |
| 2019/0079734 A1* | 3/2019 | Kadam | G06F 8/41 |

OTHER PUBLICATIONS

Abner Mendoza • Guofei Gu; Mobile Application Web API Reconnaissance: Web-to-Mobile Inconsistencies & Vulnerabilities; 2018 IEEE Symposium on Security and Privacy (SP) (pp. 756-769); (Year: 2018).*

M. P. Robillard • E. Bodden • D. Kawrykow • M. Mezini • T. Ratchford; Automated API Property Inference Techniques; IEEE Transactions on Software Engineering (vol. 39, Issue: 5, pp. 613-637); (Year: 2013).*

Application No. EP20153839.4, Extended European Search Report, dated Jul. 13, 2020, 10 pages.

Ponta et al., "Beyond Metadata: Code-Centric and Usage-Based Analysis of Known Vulnerabilities in Open-Source Software", IEEE International Conference on Software Maintenance and Evolution, Sep. 23, 2018, pp. 449-460.

Brito, et al., "Why and How Java Developers Break APIs", 2018 IEEE 25th International Conference on Software Analysis, Evolution and Reengineering (SANER), 11 pages.

Fenton, Caleb, "How to Check Open Source Code for Vulnerabilities", DZone Security, Oct. 3, 2017, Retrieved from https://dzone.com/articles/how-to-check-open-source-code-for-vulnerabilities on Aug. 28, 2018, 8 pages.

Ibrahim, et al., "A Requirements Traceability To Support Change Impact Analysis", 12 pages.

* cited by examiner

| | |
|---|---|
| 402 | For each Product |
| 404 | For each Microservice in Product |
| 406 | For each dependency library in Microservice |
| 408 | If library is updated |
| 410 | Get Release notes and Changelog |
| 412 | Determine if there are any CVEs or security issues fixed |
| 414 | Run backward compatibility check between current and new versions |
| 416 | Is CVE or Security Fix? |
| 418 | Capture info for each library |
| 420 | Add to the vulnerable library list |
| 422 | End If |
| 424 | End For |
| 426 | Save list of vulnerable libraries for each Microservice |
| 428 | End For |
| 430 | Aggregate list of vulnerable libraries for each Product |
| 432 | End For |

FIG. 4

| 502 | Create Map of Microservice and api's |
| 504 | Create Map of Microservice and third party dependencies/libraries used |
| 506 | Get the vulnerable library list from step 312 |
| 508 | For each element in Vulnerable library list |
| 510 | Create an interceptor/code hook for each dependencies |
| 512 | Define pre and post interceptor/code hook implementations |
| 514 | For each dependency in the list |
| 516 | Run the build with the test suite |
| 518 | Capture impacted Api's, percentage of impact and vulnerability name |
| 520 | End for |
| 522 | End for |

FIG. 5

CONTINUOUS VULNERABILITY MANAGEMENT FOR MODERN APPLICATIONS

BACKGROUND

Application services, microservices, and software packages and their API implementations can use a number of open-source or third-party libraries. A microservice's functional dependence on its libraries may cause existing code to become susceptible to new vulnerabilities even when microservice code dependencies remain unaltered. The microservices may be exposed to previously unknown vulnerabilities as a result of the updated API's interaction with existing libraries. Alternatively, a microservice may remain unchanged while libraries are updated, similarly creating the possibility for exposing the microservice to vulnerabilities. Furthermore, some libraries may have multiple dependencies on subsequent libraries, creating a dependency tree. A microservice may be dependent on a large number of libraries to function, therefore creating more opportunities for malicious attacks (hacking, unauthorized use, etc.) on the API.

Often, vulnerabilities in open-source libraries are reported publicly. By nature of being public, a vulnerable library can become a primary target for malicious attacks. Typically, the analysis and resolution of vulnerabilities within an API or within a microservice implementation in relation to its dependencies is performed manually, as it is difficult to properly perform such operations in an automated fashion. Manual inspection for each update of an API or microservice can be time-consuming and resource draining. A solution is needed to quickly identify and address any vulnerabilities within an API caused by its dependence on libraries that are likely to be targeted by hackers.

BRIEF SUMMARY

Embodiments provide apparatuses, methods, and systems provide more robust and accurate solutions for continuous and automatic vulnerability management for modern applications. According to some embodiments, a computer system can perform a method for securing vulnerabilities in a software package. The method can include receiving a set of libraries corresponding to third-party software used by the software package. A list of afflicted libraries from the set of libraries can be determined, wherein each library of the list of afflicted libraries is affected by a vulnerability. One or more afflicted libraries from the list of afflicted libraries upon which an application of the software package depends can be determined, wherein the application executes code from the one or more afflicted libraries, and wherein the application calls the one or more afflicted libraries. A number of code calls that include the vulnerability can be identified for each library of the one or more afflicted libraries. A code call can be made by an application program interface ("API") of the application of the software package, and wherein the code calls are made to code within each library of the one or more afflicted libraries. A risk score can be assigned to the API based on the number of code calls. The risk score of the API can be compared to a threshold risk value. A remedial action can be taken for each afflicted library called by the API in response to the risk score exceeding the threshold risk value.

Various embodiments can include a non-transitory computer-readable medium comprising instructions that are executable by a processing device for causing the processing device to receive a set of libraries corresponding to third-party software used by the software package through the communications port. A list of afflicted libraries from the set of libraries can be determined, wherein each library of the list of afflicted libraries is affected by a vulnerability. One or more afflicted libraries from the list of afflicted libraries upon which an application of the software package depends can be determined, wherein the application executes code from the one or more afflicted libraries, and wherein the application calls the one or more afflicted libraries. A number of code calls that include the vulnerability can be identified for each library of the one or more afflicted libraries. A code call can be made by an application program interface ("API") of the application of the software package, and wherein the code calls are made to code within each library of the one or more afflicted libraries. A risk score can be assigned to the API based on the number of code calls. The risk score of the API can be compared to a threshold risk value. A remedial action can be taken for each afflicted library called by the API in response to the risk score exceeding the threshold risk value.

Embodiments can include a system including a processing device, a communications port, and a non-transitory computer-readable medium comprising instructions that are executable by the processing device. The system can receive a set of libraries corresponding to third-party software used by the software package through the communications port. A list of afflicted libraries from the set of libraries can be determined, wherein each library of the list of afflicted libraries is affected by a vulnerability. One or more afflicted libraries from the list of afflicted libraries upon which an application of the software package depends can be determined, wherein the application executes code from the one or more afflicted libraries, and wherein the application calls the one or more afflicted libraries. A number of code calls that include the vulnerability can be identified for each library of the one or more afflicted libraries. A code call can be made by an application program interface ("API") of the application of the software package, and wherein the code calls are made to code within each library of the one or more afflicted libraries. A risk score can be assigned to the API based on the number of code calls. The risk score of the API can be compared to a threshold risk value. A remedial action can be taken for each afflicted library called by the API in response to the risk score exceeding the threshold risk value.

These and other embodiments of the invention are described in detail below. For example, other embodiments are directed to systems, devices, and computer readable media associated with methods described herein.

A better understanding of the nature and advantages of embodiments may be gained with reference to the following detailed description and the accompanying drawings.

BRIEF DESCRIPTION OF THE DRAWINGS

FIG. 4 illustrates pseudo logic that can be used to aggregate a list of vulnerable third-party libraries according to some embodiments of the present invention.

FIG. 5 illustrates pseudo logic that can be used to measure the security exposures according to some embodiments of the present invention.

TERMS

Figure 1:
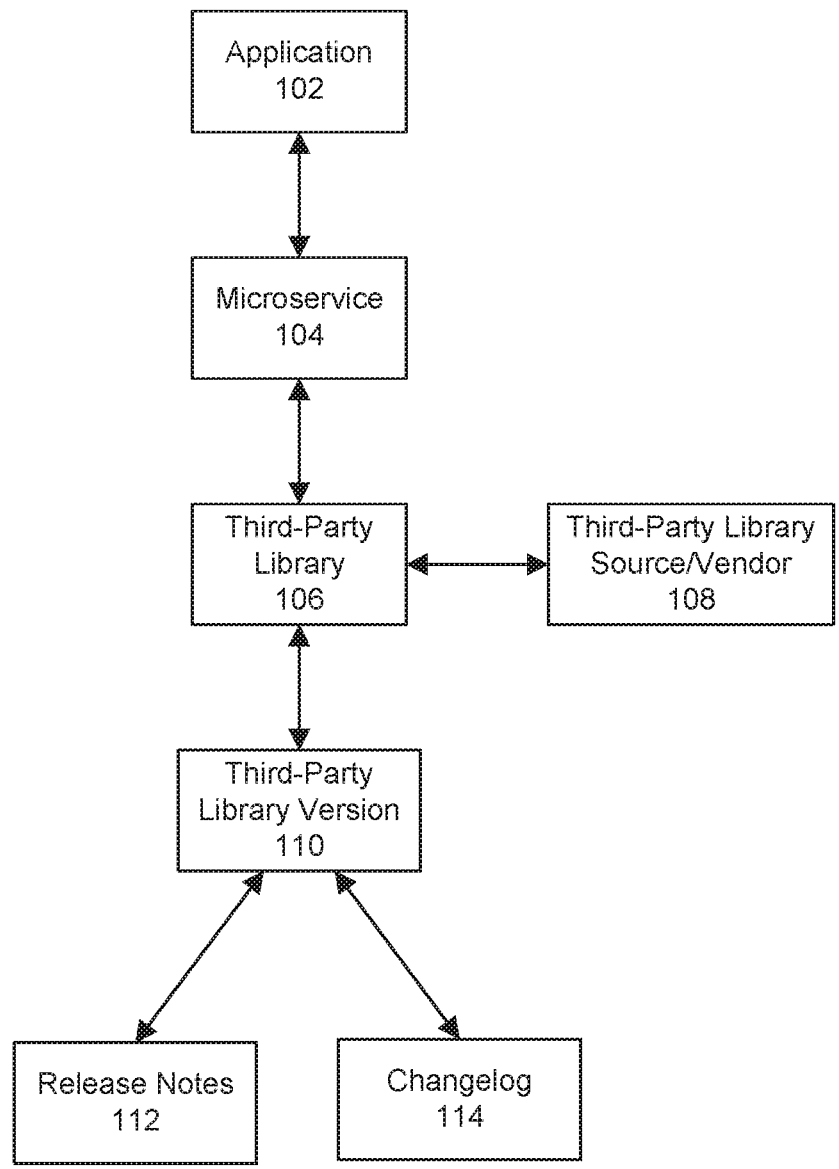
FIG. 1 is a diagram depicting a user travel path and available recommendation choices for next locations to visit according to some embodiments of the present invention.

The term "application program interface" ("API") may refer to a set of routines, protocols, or tools for building software applications. An API can be a set of clearly defined methods of communication and interaction among various programming components. For example, an API can be used to program a graphical user interface, an operating system, applications, database system, software library, web-based systems, or computer hardware. A single API can have multiple implementations (or none, being abstract) in the form of different libraries that share the same programming interface. An API may include specifications for routines, data structures, object classes, variables, or remote calls. Some examples of APIs include POSIX, Windows API, and ASPI. An API can be related to a software library. An API can describe and prescribe the specification while the library is an actual implementation of this set of rules. A single API can have multiple implementations in the form of different libraries that share the same programming interface.

The term "microservice" may include services that operates in a loosely coupled manner with a collection of other microservices in order to implement an application. For example, a video streaming server may provide a video streaming service to client computers using a plurality of microservices, wherein one microservice may provide the user interface front end, another microservice may manage a database of videos, a third microservice may manage video encoding, etc.

The term "common vulnerability and exposure" ("CVE") may refer to a catalog of known security threats. A CVE can include vulnerabilities and exposures that have been reported within the public domain. A common vulnerability can be a mistake in software code that provides an attacker with direct access to a system or network. For example, the vulnerability may allow an attacker to pose as a superuser or system administrator who has full access privileges. A common exposure, can be a mistake in software code or configuration that provides an attacker with indirect access to a system or network. For example, an exposure may allow an attacker to secretly gather customer information that could be sold. The CVE can be used to The term "library" may refer to a collection of non-volatile resources used by computer programs, a suite of data and programming code that is used to develop and implement software programs and applications. often for software development. These may include configuration data, procedures, scripts, documentation, help data, message templates, pre-written code and subroutines, classes, values, or type specifications. For example, a microservice can depend on a number of third-party libraries to implement the various functions of the microservice by calling subroutines or data structures within each library.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

DETAILED DESCRIPTION

Various embodiments provide apparatuses, methods, and systems pertaining to the implementation of continuous and automatic vulnerability management for modern applications. Some embodiments address problems that may occur when updating libraries upon which microservices are dependent by providing a more robust and faster solution for determining and addressing common vulnerabilities and exposures ("CVEs") within APIs used by a software package. As an example, this can be done by: (i) determining a list of libraries within an API that may be affected by a CVE, (ii) quantifying a number of APIs that may be affected by a CVE and how significantly each API has been affected, (iii) and providing a notification or a report that contains the quantified analysis of potential CVEs.

In further detail, a list of third-party libraries can be obtained and mapped to their dependencies within a microservice and subsequently their APIs. Open-source third-party libraries can then be mapped to their corresponding source Uniform Resource Identifiers ("URIs"). This allows the invention to map the multiservice dependencies within APIs and link the libraries to publicly known information (e.g., patches, release notes, versions, or other information related to control of CVEs). A web crawler can be used to search through the mapped uniform resource identifiers ("URIs") to determine which libraries have newer versions with updates, and therefore may include a potential CVE. Additionally, when checking if updated versions exist, the invention can determine if backwards compatibility is broken in the newer versions of libraries.

After determining a list of potentially vulnerable microservices, the amount of libraries with known vulnerabilities and other security fixes, and how significantly each microservice is affected can be quantified. For each known security-related fix, the invention can determine (i) the severity of the vulnerability, (ii) the number of code paths affected, (iii) whether a direct or transitive dependency is involved, and (iv) the number of dependencies that have the known CVE(s) affecting an API. This information can then be used to quantify the business functionality affected due to these vulnerabilities.

For example, there may be a number of dependencies that include a known CVE affecting an API. The invention may categorize or rate the significance of a known CVE for each dependency. For example, one dependency affected by a CVE may be called within code by an API a number of times, such that each code call may create an attack opportunity. This dependency would be categorized as an issue and can be attributed some level of criticality or risk score by some embodiments. Another dependency may contain the known CVE, but its code may not be called when executing an API. The invention can note that this dependency contains the CVE, but may attribute little or no risk score because the risk of executing the CVE within code is minimal or nonexistent. Any dependency identified as not containing the CVE can be attributed no risk. Embodiments can then output the quantified analysis as a notification or report useable for further debugging, fixing, or updating potential issues within a library. This method can allow an organization to continuously monitor the vulnerabilities of the applications and business services and can provide a risk score to make decisions on whether the fixes should or should not be made depending upon the severity of the vulnerability and based on the business functionality affected.

I. INTRODUCTION

The growing attack surface due to a significant increase in third-party libraries dependencies, especially open source libraries, is a big challenge in modern applications. The visibility of these vulnerabilities for a set of deployed microservices and their APIs is crucial. In addition, after the vulnerabilities are found, it can be important to improve recoverability. New vulnerabilities may not actually be new security holes, but instead only newly disclosed vulnerabilities that impact old, existing code. This means new known vulnerabilities could exist without making any code changes.

Modern applications can have large number of microservices with direct and transitive dependencies. This can lead to a significantly large attack surface. Attackers can target open source dependencies more and more, as their reuse provides many victims for a malicious hacker. It can be beneficial for the security of systems implementing APIs to ensure there are no known vulnerabilities in the entire dependency tree of the application. It can be likely that the level of exposure in microservices and APIs may not be known for a given vulnerability in one of the dependencies. This creates a need for an automated way to proactively detect the security vulnerabilities caused due to a discovered vulnerability in a third party dependency and subsequently fix the vulnerabilities.

FIG. 1 is a diagram depicting a dependency tree for applications, microservices, and third party information including libraries according to one example. An application can utilize one or more microservices to perform various functions. Microservices can perform various functions implementing one or more libraries. For example, an application 102 can use a microservice 104 to perform software related functions. The microservice 104 can call subroutines, data structures, procedures, scripts, or the like that are stored in a third-party library 106 to execute or aid in the execution of microservice functions.

In some examples, the third-party library 106 can depend on other libraries or be used as a dependent library upon which other libraries depend upon. The third-party library 106 can have a third-party library version 110, such that different versions of the third-party library 106 have different code where newer versions often include fixes to solve issues with previous versions. The third-party library 106 and third-party library version 110 can be created, provided, updated, or otherwise managed by a third-party library source or vendor 108. Updates to the third-party library 106 utilized within a system can be automatic, such that a third-party library source or vendor 108 can implement "patches" that take effect upon release. Commonly, updates to the third-party library 106 are manual, such that a manager or programmer of the application 102 or the microservice 104 can choose which versions of the third-party library 106 to implement and when.

When the third-party library version 110 is changed either automatically or manually, new CVEs may be created within the microservice 104 that depends on the third-party library 106. The resulting newly created CVEs in the microservice 104 can create potential vulnerabilities or code errors within the application 102. Various microservices can utilize portions of the third-party library 106 in conjunction with other libraries and microservice code to achieve different microservice functionality. An update to the third-party library version 110 may cause unexpected code changes within the microservice 104. The code changes may affect the way the microservice 104 executes code.

For example, the third-party library source or vendor 108 can maintain a third-party library 106 with specific functions in mind. Updates to the third-party library version 110 may seek to solve errors or security risks present in previous versions that some of the depending microservices have experienced. Some microservices may use the third-party library 106 in a different capacity than most of the microservices for which the update to the third-party library version 110 was intended. Thus, those outlier microservices may experience newly created CVEs as a result of the update to the third-party library version 110 that was intended to address other issues or CVEs. As another example, an update to the third-party library version 110 may simply be poorly designed, negatively affecting most depending microservices and creating one or more widespread CVEs.

To help identify CVEs preemptively or avoid updating to library versions that may cause CVEs, the third-party library source or vendor 108 can include release notes 112 and a changelog 114 within or along with the third-party library version 110. The release notes 112 and the changelog 114 can provide detailed descriptions of the changes made to the contents of the third-party library 106 so that programmers or managers of the microservice 104 and/or application 102 can alter code, if necessary, to be compatible with the updated third-party library version 110. In some examples, updates to the third-party library version 110 may not affect the way a microservice 104 operates if the microservice 104 does not call upon code affected by the version update. In this example, the microservice 104 would not need to be updated to adapt to the version update to avoid any newly created CVEs.

It can be beneficial to identify the CVEs created by updates to third-party libraries upon which microservices rely because attackers may be able to exploit more readily those CVEs due to their public nature. For example, a CVE for the third-party library 106 may be identified by a user or the third-party library source or vendor 108 and reported as public knowledge. An attacker can be aware of the publically know CVE and try to attack the microservice 104 that may have updated to the latest CVE-ridden version of the third-party library 106 automatically or without altering code to adapt to the changes in the third-party library version 110.

Conventionally, CVEs have been addressed through manual diagnostics and error checking. For example, a programmer can read release notes and changelogs accompanying a library version update to determine what, if any, portions of a microservice that calls with library will be affected. Any code of the microservice that utilizes updated portions of the library can then be recoded to ensure the library can be implemented within the microservice without errors or vulnerabilities. In some examples, Continuous Integration/Build system plug-ins can be used to provide a static-analysis of a microservice's code to determine which library, API, or microservice service is being affected by any code change in a dependency tree. However, determination of what code is affected does not provide a quantification of the CVE exposure that can be used to make a decision as to whether a version upgrade will impact a system significantly. Embodiments of the invention provide solutions for determining a quantification of CVE impact on microservice and/or API code. This quantification can be used to determine whether a third-party library can be updated to its latest version with little or no negative effect on application functionality and security.

Plug-ins providing static analysis of code can suffer from additional limitations. A plug-in can lead to a potential vulnerability in a similar fashion to virus software, such that the analysis of any potential vulnerability it based on the library of the plug-in. The plug-in does not detect potential vulnerabilities based on the library of the API at issue, and therefore fails to address any potential issues within the dependencies of an architecture.

Embodiments can address the abovementioned problems by doing the following: (i) proactively detecting vulnerabilities in third party dependencies; (ii) providing visibility and measuring the security exposure of the APIs (and the microservices) for each application; (iii) addressing the vulnerabilities in deployed applications based on the severity of the exposure; and (iv) causing a remedial action such as a notification to address the vulnerabilities. The embodiments for continuous and automatic vulnerability management for modern applications disclosed herein seeks to provide solutions for these examples and other problems encountered when attempting manage and maintain APIs free of debilitating CVEs.

II. CONTINUOUS VULNERABILITY MANAGEMENT

Figure 2:
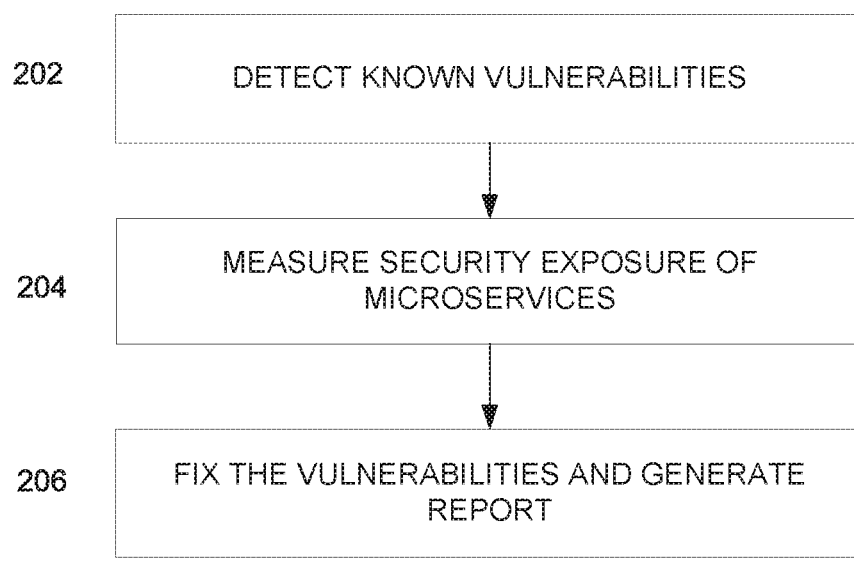
FIG. 2 depicts a flowchart for performing continuous and automatic vulnerability management according to some embodiments of the present invention.

In this section, descriptions of various steps used to perform continuous and automatic vulnerability management are provided. FIG. 2 depicts a flowchart for performing continuous and automatic vulnerability management according to one example. In block 202, known vulnerabilities are detected. This can include mapping each dependency, or library, to an application, where a software package can include multiple applications. A list of vulnerable libraries containing CVEs can be generated. In block 204, the security exposure of microservices is measured. Using the dependency tree mapped from block 202, the list of vulnerable libraries can be analyzed to determine how many times each library's code containing a CVE is called to perform operations of the software package. By accumulating the total number of code calls with CVEs for each library, the criticality of the CVE, and the impact to business functionality, a risk score can be assigned to each library and/or API. A risk score can represent the potential chance of a library being susceptible to a hacking attempt or security breach. In block 206, vulnerabilities within the libraries containing CVEs can be fixed and a report can be generated that includes information regarding each library with a CVE and/or a risk score above a threshold value. Based on the risk score of each library in comparison to a threshold value, a remedial action can be performed.

A. Detect Known Vulnerabilities

Figure 3A:
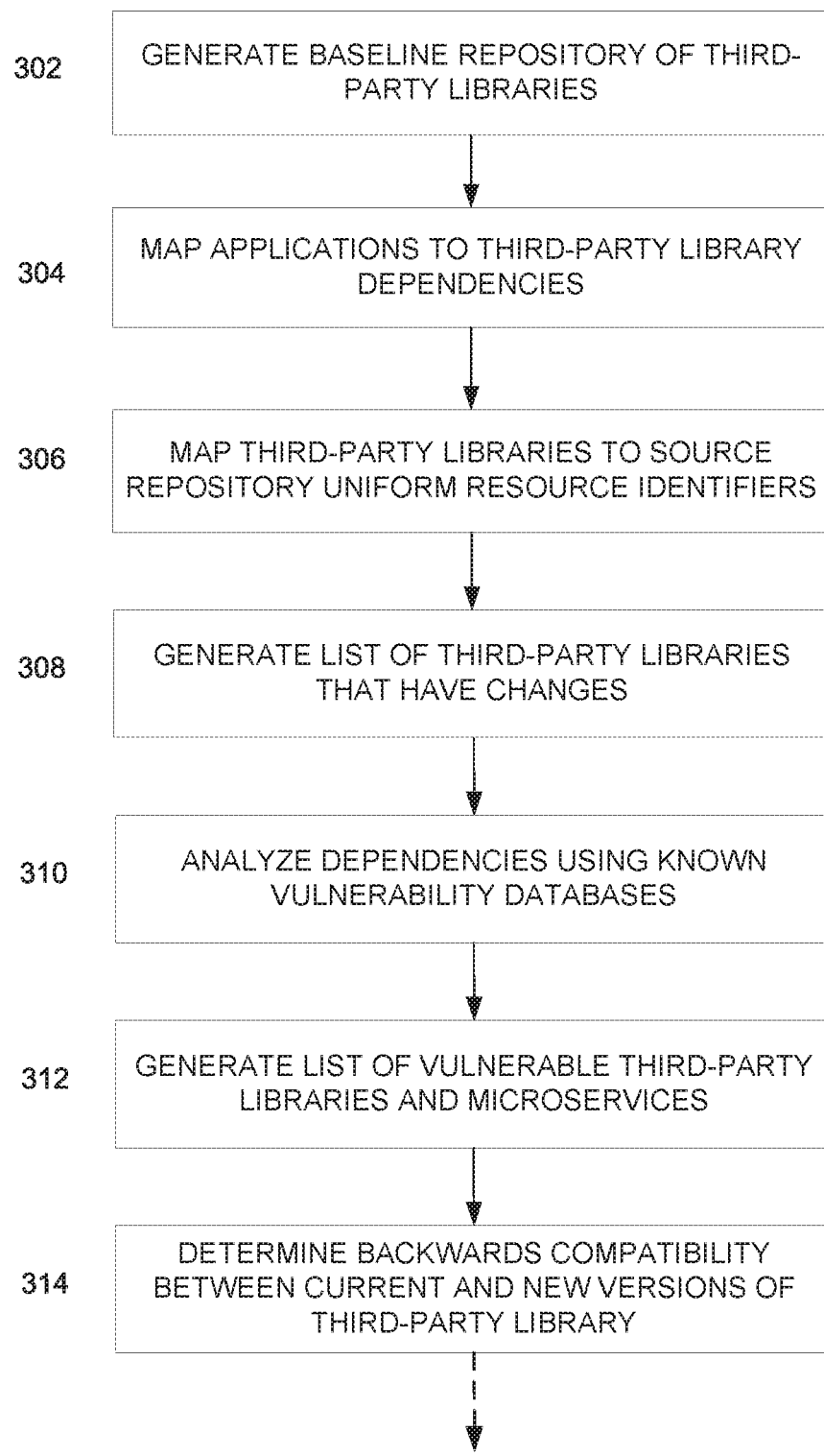
FIG. 3A is a flowchart for detecting known vulnerabilities in continuous vulnerability management according to some embodiments of the present invention.

FIG. 3A depicts a flowchart for detecting known vulnerabilities in continuous vulnerability management according to some embodiments of the present invention. Known vulnerabilities are publicly disclosed security bugs, typically found and logged by users, or reported by security researchers. Being public makes known vulnerabilities the easiest and most accessible for attackers to find and exploit, and therefore are crucial to resolve when managing an application and its corresponding versions of libraries. A mapping of the application dependency tree can be created, followed by a mapping of the third-party libraries to their available release notes and changelogs, can be used to determine a list of all dependencies and affected microservices that have vulnerabilities.

In block 302, a baseline repository of all third-party libraries is generated. The baseline repository can include library information from a number of publically available third-party libraries (e.g., SourceClear Knowledge Center, Mitre's CVE Database, Ruby Advisory DB, OSS Index, etc.). This repository can include a list of all known third-party libraries, such that some of the libraries within the repository may not be used by any application or service deployed by a user that is being tested for CVEs. For example, the baseline repository can include thousands or hundreds of thousands of third-party libraries used throughout various types of APIs with diverse functionality where those libraries are readily accessible within the public domain.

In block 304, deployed applications are mapped to their third-party library dependencies. Using the baseline repository generated in block 302, the third-party libraries stored within the repository can be linked to every application that uses each third-party library. For example, the repository can have hundreds of third-party libraries related to network connectivity. One application of a service provider may use half of those third-party libraries, and another application of the service provider may only use a few of those libraries. Each actively deployed application can be mapped, or linked, to each third-party library that is called or otherwise implemented by any code or microservice within the application. Mapping the deployed applications to their third-party library dependencies can include dependency version information. This can provide a snapshot of the current status of each third-party library used by each application.

In block 306, the third-party libraries are mapped to their corresponding source repository URIs. Open source, public vendor, and closed vendor URIs can include release notes and changelogs for each third-party library. Mapping the source repository URIs to the third-party libraries indirectly links the deployed applications that use the third-party libraries to the source repository URIs. Thus, any release notes or changelogs accompanying a version of a third-party library that are provided by a third party can be linked to each application. This can allow for dynamic and real-time association of each application with the most current release notes or changelogs provided by a third-party. For example, an application can be linked to a third-party library as described in block 304, and the application can be indirectly linked to the URIs corresponding to that library. A third-party may release updated information regarding the URIs of that library (e.g., release notes, changelogs, updated library version). Since the library mapped to the application was linked to the source repository URIs previously, the updated information for the third-party library may be retrieved using the URIs, such that a new mapping does not need to be created to retrieve the updated information.

In some examples, the source repository URI information can be mapped to every third-party library within the third-party library repository generated in block 302. This can create a more complete repository by linking URI information that may not be used in a present CVE analysis, but may be used in future CVE analysis. In some examples, the source repository URI information can be mapped to only the third-party libraries that are used by an application being texted for CVEs. This can avoid consumption of computational resources by avoiding mapping URI information corresponding to libraries that are not used by the application under review.

The result of the generation of the baseline repository and subsequent mapping of dependencies as described in blocks 302, 304, 306 is a dependency tree similar to that of FIG. 1. This reverse mapping of the dependency tree can allow for analysis of direct and transitive dependencies that conventional plug-ins are not able to address, since they are limited to their own libraries. This dependency tree and its contents can then be analyzed to determine which third-party libraries have been updated and which possibly contain CVEs as implemented within a system architecture.

In block 308, a list of third-party libraries that have any changes is generated. Changes to third-party libraries can include bug-fixes, CVE fixes, or other code changes that may or may not affect the functionality of the microservice (s) implemented within the application. A web crawler may be programmed to automatically parse through the URIs collected in block 306 to determine which, if any, third-party libraries have been altered from the versions stored within the baseline repository generated in block 302. For example, the web crawler can determine which third-party libraries identified by the collected URIs have a newer version in comparison to the version stored within the baseline repository. The third-party libraries identified as potentially having an updated version can be stored as a list to analyze for potential CVEs. Third-party libraries actively being used that do not have newer versions as determined by the web crawler visiting the corresponding URIs can be disregarding for CVE analysis, since any potential CVE issue should have been addressed in previous updates to the API.

In block 310, the dependency tree created from blocks 302, 304, 306 is analyzed using known vulnerability databases. Known vulnerability databases sourced from the Internet can be used to search for issues in the dependency tree, specifically with respect to the list of third-party libraries that have changes that is generated in block 308. Known vulnerability databases can include lists of all errors caused by known CVEs that have been experienced and reported by various entities using the third-party libraries. Both direct and transitive dependencies of the dependency tree can be analyzed to determine if any known CVE issues are present.

The release notes and changelogs of the list of baseline third-party libraries that have changes generated in block 308 can be collected and parsed for analysis. The release notes and changelogs can be run through a natural language processing ("NLP") engine that understands the semantics of software bug-fixes and vulnerabilities (e.g., CVEs, remote command executions ("RCEs"), etc.). A NLP engine can be used to determine whether a known CVE has been fixed in a newer version of a library as compared to a current version of a library being implemented in an API. For example, an NLP engine can determine that a newer version of a third-party library does not fix a known CVE present within the version of the third-party library employed currently within an API. In this example, the NLP engine can determine to not retrieve the latest version of the third-party library from the source or vendor since the new version does not address the CVE issue. Thus, the current version would not be updated to the latest version. Where the NLP engine determines that a newer version of the third-party library dependency would fix a CVE issue, then the newer version can be retrieved and applied within the API over the outdated version of the library.

In block 312, a list of vulnerable third-party libraries and microservices is generated. The lists can be generated based on the analysis performed in block 310. The results from processing the release notes and changelogs of changed library versions using an NLP engine can be tabulated based on the NLP analysis performed in block 310. The list can include all direct and transitive dependencies that have vulnerabilities, the corresponding versions that are fixed, and a log recording any changes made in updated library version. The list can also include all of the microservices and APIs affected from the potential vulnerabilities due to the vulnerable direct and transitive dependencies. Alternatively, a separate list of affected microservices or APIs can be generated.

In block 314, a backwards compatibility check is performed between current and new versions of a third-party library. Any new version of the dependency that has a fix or change can checked against the current version of the dependency for backward compatibility changes. This can ensure that updating to a newer version of a third-party library would not break the existing APIs. In some examples, the a backwards compatibility tool can be used to determine if updating dependencies can cause a break in an API when updating would be recommended to fix a known CVE. If updating to a newer version of a dependency that is expected to cause a break in an API, a recommendation can be made to manually alter the dependency code to resolve the expected break. Dependencies that are determined to have no compatibility changes that would result in a break can be freely updated without issue. Block 314 can be performed automatically after identifying the list of vulnerable third-party libraries and microservices as described in block 312. For example, a backwards compatibility analysis can be performed using a tool such as the APIDIFF tool [2].

FIG. 4 illustrates pseudo logic that can be used to aggregate a list of vulnerable third-party libraries according to some examples. A product can be any software package than can include one or more microservices (e.g., a software suite licensed to third-parties). In some examples, libraries may have newer versions that resolve issues with a current or baseline version being implemented in microservices within each product.

The pseudo logic can include the processes described in blocks 308, 310, 312, and 314. Line 408 can include the initialization of for loop logic, such that the remainder of the logic provided by lines 410 through 424 is executed upon determination that a library is updated. The determination that a library has been updated and that the for loop logic should be executed is described in blocks 308 and 310 of FIG. 3A. If a library has been updated, then line 410 of the pseudo logic to obtain release notes and changelogs can be executed, which can correspond to the processes described by block 310 of FIG. 3A. Line 412 can correspond to the NLP of block 310 that can determine if there are any CVEs or security issues fixed by newer library versions. In addition to checking for CVEs as described in block 310, embodiments can check non-CVEs issues such as security issues. Security issues may be any errors or potentially vulnerable portions of a dependency other than CVEs. For example, a security issue may not be a known vulnerability and therefore not a CVE, but may be an isolated instance of a security vulnerability specific to a dependency, where an updated version of the dependency may seek to resolve that security issue.

Line 414 can correspond to the processes described in block 314 of FIG. 3 that describe performing a backwards compatibility check. Block 312 can be performed at lines 418 and 420, that includes obtaining information for each vulnerable library then generating a vulnerable library list, adding a new vulnerable library to the list as the for loop at line 408 is reiterated. Lines 426 and 430 include creating a total vulnerable library list across all microservices that are used for each product. Thus, the for loop beginning on line 406 determines if each library in a microservice has been updated or if a new version is available, and the for loop at line 404 performs the line 406 for loop for each microservice within a product. The for loop at line 402 can execute all the pseudo logic sequentially to determine which libraries have been updated for each microservice across each product.

B. Measure the Security Exposure of Microservices

After determining that a microservice has a dependency on a third-party library that has a known vulnerability as determined in blocks 302 through 314, the extent of the CVE can be determined. After creating a list of vulnerable third-party libraries and microservices in block 312, a quantification of the problems created by CVE can be performed to assess how many APIs are affected within a microservice exhibiting CVEs. This quantification can be correlated with the amount of business functionality affected due to the afflicted APIs. Various test suites can be run to determine which code paths and which APIs are affected by the dependency vulnerabilities. A report can be generated to show the affected APIs and the code paths affected in each microservice. A risk score can be assigned to each API affected by a CVE based on factors including the severity of the vulnerability, the number of code paths affected by the issue for each API, whether the affected dependency is a direct or transitive dependency, and the number of dependencies that have known CVEs affecting the API.

A risk score can be associated with a microservice or API that depends on one or more third-party libraries affected by a CVE. A risk score can be utilized to determine whether to implement updates to dependencies afflicted with CVEs or to update to newer versions that include CVEs but significant functional updates. For example, if a risk score associated with a dependency is high when the number of code calls involving a CVE is high. A risk score associated with a dependency is low when the number of code calls involving a CVE is low. Risk scores that are determined to be greater than a certain threshold level can result in providing recommendations to take some action to alleviate the risk (e.g., update dependency version, provide notification report with causes of high risk score).

Figure 3B:
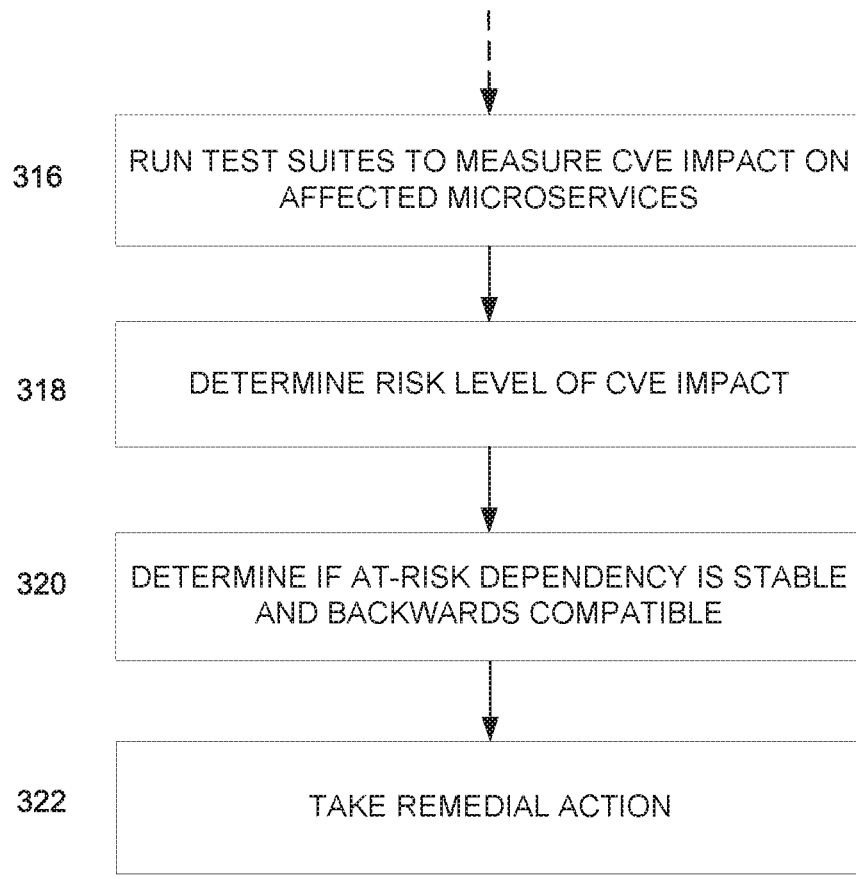
FIG. 3B is a flowchart for measuring and reporting the security exposure of microservices in continuous vulnerability management according to some embodiments of the present invention.

FIG. 3B is a flowchart for measuring and reporting the security exposure of microservices in continuous vulnerability management according to some examples. In block 316, one or more test suites can be run to measure characteristics of CVE impact on affected microservices and APIs. A Suite of test software can be used to test code paths that are called by microservices. Application of the test suites can improve accuracy of the measured characteristics of the CVE impact when test coverage is higher. For example, test coverage can be higher when a majority of the code paths in an application are tested by the suite of tests. Test coverage can be low when too few of the code paths are tested by the suite of tests. Test coverage that is too low may not provide a thorough depiction of the impact of the CVEs within the application.

Code interceptors can be run along with a test suite. A name space can be created for each affected vulnerable library. An interceptor acting as a code hook can be implanted within the code of an affected library to cause any code that executes the name space to be logged. Code that is executed within a name space as identified and retrieved by an interceptor can be logged within a database. This can allow the number of code calls of that specific code within a namespace to be quantified. Quantifying the number of code calls during testing can determine which, if any, of the code corresponding to each name space creates a higher risk of vulnerability or exposure. For the following examples, assume test coverage is high (e.g., 90%). In one example, a code call with a CVE can be called a number of times, which can create a higher security risk compared to code with a CVE that is called only once during testing. Code with a number of CVEs may never be called by a microservice during operation of the test suite, and therefore may pose an even lower threat to security. Code calls with no CVEs may pose no threat to security.

In block 318, a risk level of the impact of the CVE is determined. After running the test suite to log each code hook within a database, the database of collected code hook information can be analyzed to determine which APIs were affected by the code calls and how many times a name space was called for each API. By analyzing the number of times an API executed code at a name space, the overall impact on each API can be determined. Based upon which APIs are affected and how often those APIs are implemented within a microservice, an application for a specific service can be attributed a certain risk score. For example, an API with vulnerable dependencies may create a high risk score in one use example (e.g., a business application) while the same API may create a lower risk score in another use example. The risk score for the corresponding applications can be assigned based on the context of the application in a business setting. For example, the addition of a credit card for use in a payment option may be more crucial than sending an acknowledgement that a shipment has been received, and may therefore be attributed a higher risk score despite the affected API being used in both contextual settings.

Various threshold levels can exist to categorize affected microservices. A threshold level can be a maximum number of times a library's code executing a CVE is called by an API. For example, a low threshold can have a high number of allowable affected code calls, a medium threshold can have a lower number of allowable affected code calls, and a higher threshold can have an even lower number of allowable affected code calls. In some examples, priority ratings can be given to certain code calls depending on the context of the business application. For example, a risk score of an API can be multiplied to assign more weight to that specific API as compared to other APIs. This can allow certain API functionalities to be prioritized over other APIs depending on the context of the application. The attributed weights can then be compared to given thresholds levels to determine if an API causes a microservice to be of low, medium, or high risk. Other categories besides low, medium, and high risk can be used as understood by a practitioner in the field of this invention.

If an affected API impact level falls below a threshold value (e.g., a percentage), such that implementation of the API does not pose a significant security threat to the functions of the application, then no action may be taken. If an affected API impact level is greater than a threshold value where the API may pose a significant security threat, then an analysis as to whether the current version of the API's affected dependency should be updated to the latest version is determined.

In some examples, a threshold value may be determined in any number of ways conceivable by a practitioner of skill in the relevant field of technology. Any portion of a dependency tree (e.g., software package, application, microservice, API, library, etc.) may be attributed a threshold value in relation to another portion of the dependency tree. For example, an application may be assigned a threshold value of 50%, such that if 50% or more of the libraries called within an application have a CVE, then some remedial action can be taken to either provide a notification including information regarding the CVEs or to reduce the threshold level to an acceptable operating level. Different threshold levels can be assigned to various portions of the dependency tree. Continuing the previous example with an application having a threshold level of 50%, another application used in the operation of a software package may have a threshold level of 20%. In some examples, In some examples, code that is not being called during testing can be determined. A database storing the code calls can initiate a value of zero for each name space. If code for a specific name space is never called, then the value attributed to that code in the database can be zero after running the various test suites. This can mean that the code for that library called by an API does not need to be updated because it is neither detrimental nor beneficial to the operation of the API.

FIG. 5 illustrates pseudo logic that can be used to measure security exposures according to some examples. The pseudo logic can include the processes described in blocks 316 and 318. In some examples, a name of a detected vulnerability can be determined for each dependency within the vulnerable library list.

At line 502 and 504 a map, or dependency tree of the microservices, APIs, and third-party libraries can be generated. The dependency tree can be generated according to the processes described in block 304 of FIG. 3A, using the libraries collected in block 302. At line 506, a vulnerabile library list can be created using the dependencies mapped in lines 502 and 504 and the pseudo logic of FIG. 4. A for loop at line 508 can be executed to analyze each element (e.g., portion of code within a vulnerable dependency) in the vulnerable library list. Lines 510 and 512 can include processes described in block 316 of FIG. 3B for implementing code hooks within code of vulnerable libraries to determine the number of time a microservice calls a portion of code that is afflicted with a CVE. The code hook can gather metrics regarding how often and when a certain API is invoked to measure the impact. For example, a code hook can increment a count of the API invocations to use in determining an impact rating or weight. A post hook can write to a file or some other data store to save information such as an API invocation count against the API and/or affected business product or service. This stored information can be used to calculate the overall risk and impact. A for loop at line 514 can run a software build with a test suite to capture an impacted API's percentage of impact (e.g., risk score), including the CVE name and other CVE related information. The line 514 for loop can be described by the processes in block 318 of FIG. 3B.

C. Fix the Vulnerabilities and Generate Report

In block 320, a determination is made as to whether an at-risk dependency is stable and backwards compatible. Using the microservices-dependencies-versions mapping that was produced in block 302 through 312, all the deployed microservices at risk that need to be patched or upgraded can be identified as described in blocks 316 and 318. A microservice with a dependency that has been attributed a risk score greater than a threshold value as determined in block 318 can be analyzed to determine what course of action should be performed to resolve the risk. Similar to the processes described in block 314, backwards compatibility between current and new versions of a third-party library can be determined using an API code comparison tool (e.g., APIDIFF tool [2]).

In block 322, a remedial action is taken to address the at-risk dependency based on the stability and backwards compatibility of the dependency version. If backwards compatibility for the new version of that affected dependency is broken or no fix is available, then a notification or report can be generated to communicate the affected dependency version, CVE issue, and other related information to relevant users. This report can help assess the risk for the business functionality affected based on the affected APIs. This assessment can help make a decision to either fix the issue or contain the problem by altering the business flows to avoid the affected APIs. In examples where there are no backward compatibility issues, then action can be taken depending on the type of applications and microservices affected. If there are no downstream dependencies, the microservice can be rolled back to a previous stable version. Otherwise, the microservice can be updated to the fixed version of the dependency. This can trigger a continuous integration build that runs the test suites and functional tests, and provides for a continuous delivery pipeline deployable in production. In some examples, a fix may include updating the current version of the affected dependency to another version of the dependency with a lower risk score, such that the other version may still include CVE issues.

III. SYSTEM FOR CONTINUOUS VULNERABILITY MANAGEMENT

Figure 6:
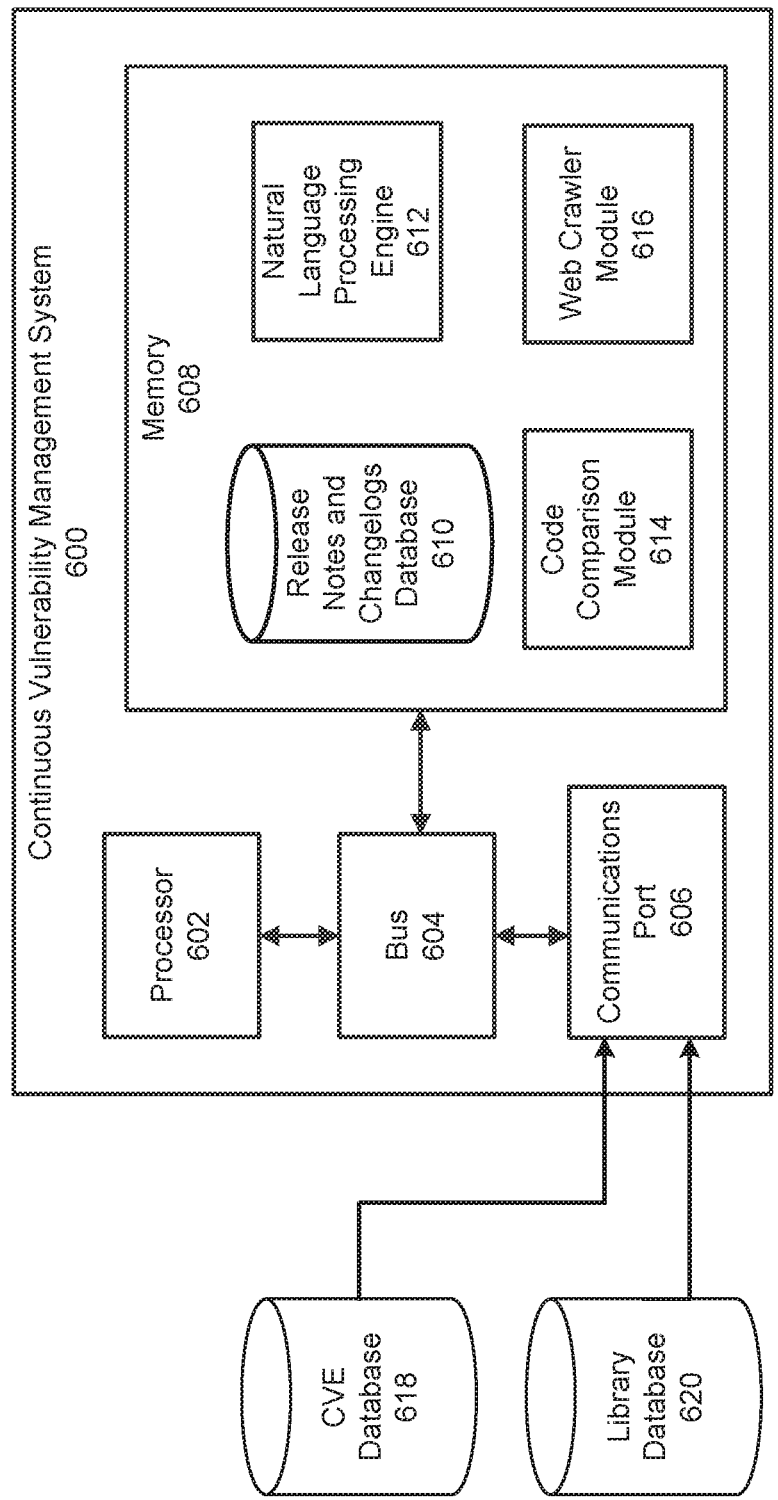
FIG. 6 is a block diagram of a continuous vulnerability management system according to some embodiments of the present invention.

FIG. 6 depicts a block diagram of a system for continuous vulnerability management according to one example. The continuous vulnerability management system 600 can include a processor 602, a bus 604, a communications port 606, and a memory 608. In some examples, the components shown in FIG. 6 (e.g., the processor 602, the bus 604, the communications port 606, and the memory 608) can be integrated into a single structure. For example, the components can be within a single housing. In other examples, the components shown in FIG. 6 can be distributed (e.g., in separate housings) and in electrical communication with each other. The continuous vulnerability management system 600 can perform any of the functions described by various embodiments of this disclosure for continuous vulnerability management. performing transition regularized non-negative matrix factorization and providing sequential recommendations.

The processor 602 can execute one or more operations for implementing some examples. The processor 602 can execute instructions stored in the memory 608 to perform the operations. The processor 602 can include one processing device or multiple processing devices. Non-limiting examples of the processor 602 include a Field-Programmable Gate Array ("FPGA"), an application-specific integrated circuit ("ASIC"), a microprocessor, etc.

The processor 602 can be communicatively coupled to the memory 608 via the bus 604. The non-volatile memory 608 may include any type of memory device that retains stored information when powered off. Non-limiting examples of the memory 608 include electrically erasable and programmable read-only memory ("EEPROM"), flash memory, or any other type of non-volatile memory. In some examples, at least some of the memory 608 can include a medium from which the processor 602 can read instructions. A computer-readable medium can include electronic, optical, magnetic, or other storage devices capable of providing the processor 602 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

CVE database 618 can include a list of CVEs known throughout the public domain, including any information related to each CVE. The library database 620 can include any third-party libraries that are identifiable and retrievable using a URI. In some examples, the CVE database 618 and the library database 620 can be a single database storing both library and CVE information. The library database 620 can be a privately owned database maintained by a vendor that includes private libraries. Communications port 606 can interface with CVE database 618 to transfer information related to CVEs to the continuous vulnerability management system 600. Communications port 606 can interface with library database 620 to transfer information (e.g., release notes, changelogs) related to third-party libraries to the continuous vulnerability management system 600. CVE and library information received by the communications port 606 can be transmitted to the memory 608 via the bus 604. The memory 608 can store any received concentration profiles and any received sensory information.

The memory 608 can include release notes and changelogs database 610 to store release notes and changelogs for each version of a library. The memory 608 can include program code for natural language processing engine 612, code comparison module 614, and web crawler module 616. The natural language processing engine 612 can use NLP to determine whether a known CVE has been fixed in a newer version of a library as compared to a current version of a library being implemented in an API. The code comparison module 614 can be used to determine if updating dependencies can cause a break in an API when updating would be recommended to fix a known CVE. The web crawler module 616 can use URIs to locate and retrieve library content and version data from the public domain.

The components of the continuous vulnerability management system 600 can be used to implement described examples, including the process flow described in FIGS. 3A and 3B. For example, a repository of current library can be generated according to the processes described in block 302.

The library database 620 can be in communication with the communications port 606 of the continuous vulnerability management system 600. For example, the library database 620 can be a server located remotely from the continuous vulnerability management system 600, where communication between the components can be established over the internet. The communications port 606 can receive libraries and library-related information that can be stored in the memory 608. The web crawler module 616 can be used to search the public domain, including the library database 620, to determine if any of the libraries used by a microservice have been updated or have updates available. This process can be included in the processes described by block 308 of FIG. 3A.

The library database 620 can include release notes and changelogs that can be stored in the release notes and changelogs database 610. As described in block 310 of FIG. 3A, NLP can be used to analyze the information stored in the release notes and changelogs database 610. The natural language processing engine 612 can be used to determine whether a known CVE has been fixed in a newer version of a library as compared to a current version of a library being implemented in an API. Information regarding the known CVEs can be communicated from the CVE database 618 to the communications port 606 for analysis by the natural language processing engine 612. By analyzing the release notes and changelogs, the natural language processing engine 612 can generate a list of vulnerable third-party libraries and corresponding microservices as described in block 312 of FIG. 3A.

The code comparison module 614 can be used to compare code of current versions of a dependency and newer versions of a dependency that are sourced from the library database 620 and stored in the memory 608. The memory 608 can include a database of each currently employed library that upon which each microservice within each software package depends. The code comparison module 614 can perform a line-by-line syntax analysis to determine which portions of code of each library have been altered. Differentiating current and newer versions of libraries can be used to determine if newer versions are backwards compatible with current versions, as described in block 314 of FIG. 3A and in block 320 of FIG. 3B. Determining if backwards compatibility is available can allow the continuous vulnerability management system 600 to provide a recommendation to not update the current version of a library to a newer version of a library to prevent breaking the microservice.

In some examples, a local repository of known CVEs can be created within the memory 608 to reduce processing time when generating a list of affected dependencies and microservices. For example, known vulnerability databases on the Internet can be collected from the CVE database 618 and other static sources (e.g., vulmon.com) and stored within a comprehensive database in the memory 608. Accessing the database locally as opposed to communicating CVE updates over the Internet can reduce processing time. A local database containing CVEs can be made current by polling the known vulnerability databases on the Internet for changes intermittently or on demand.

IV. METHOD FOR CONTINUOUS VULNERABILITY MANAGEMENT

Figure 7:
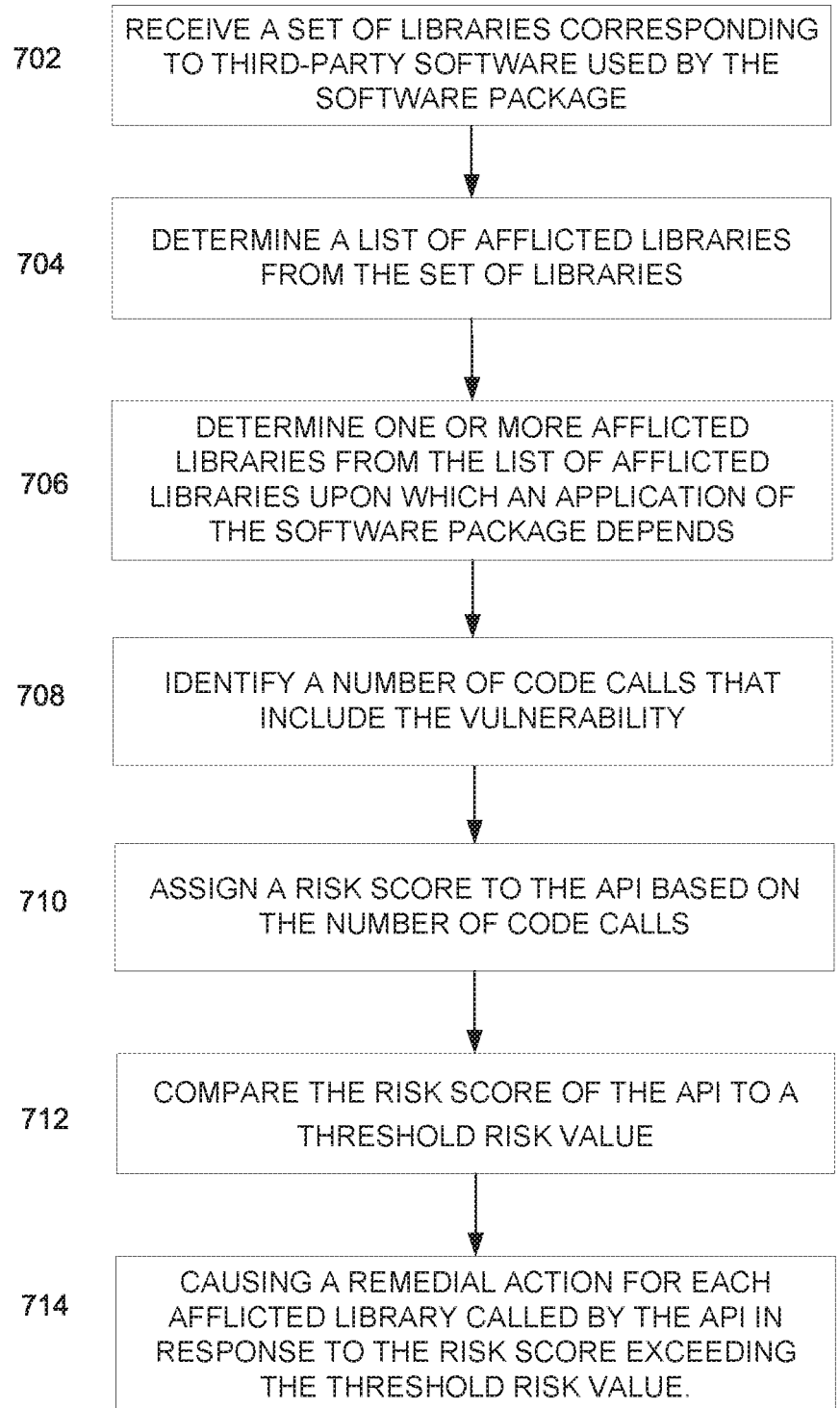
FIG. 7 is a flowchart of a process for method for securing vulnerabilities in a software package according to some embodiments of the present invention.

FIG. 7 is a flowchart of a process for method for securing vulnerabilities in a software package according to one example. The software package can be performed using a computer system. Some processes for continuous vulnerability management can be described according to previous examples.

In block 702, a set of libraries corresponding to third-party software used by the software package is received. A software package can have a number of microservices that depend upon a number of libraries. The libraries can be sourced from third-party vendors and stored in a datasbase of the computer system.

In block 704, a list of afflicted libraries from the set of libraries is determined. Each library of the list of afflicted libraries can be affected by a vulnerability. In some examples the list of afflicted libraries can be determined by storing, in a database of the computer system, a URI for each library within the set of libraries. A web crawler can search a public domain for newer versions of each library of the list of afflicted libraries based on the URI for each library. Release notes and changelogs associated with the newer versions can be stored in a database. The release notes and changelogs can be analyzed using a natural language processor engine of the computing system to determine one or more fixable libraries from the list of afflicted libraries. A newer version of a fixable library can remove or reduce an impact of the vulnerability in a current version of the fixable library.

In block 706, one or more afflicted libraries from the list of afflicted libraries upon which an application of the software package depends is determined. The application can execute code from the one or more afflicted libraries and can call the one or more afflicted libraries to perform operations of the software package.

In block 708, a number of code calls that include the vulnerability are identified. The number of code calls can be determined for each library of the one or more afflicted libraries. A code call can be made by an API of the application of the software package. The code calls can be made to code within each library of the one or more afflicted libraries. A test suite can be run to determine how many times an API within a software package calls each section of CVE-affected code within each dependent library.

In block 710, a risk score is assigned to the API based on the number of code calls. An API can have a risk score that is dependent on the susceptibility of each library that the API depends on. For example, an API may call code with a number of libraries. None of that code in those libraries may include CVEs, and therefore a low or no risk score may be assigned to the API. As another example, those libraries may have code with CVEs, but the API does not call those afflicted sections of code. Thus, the risk score may be low or no risk score may be assigned to the API. As a further example, an API may call code from libraries that include CVEs. More code calls including CVEs made by the API to the libraries can increase the risk score assigned to the API. In some examples, assigning a risk score can include determining a dependency relationship of each library from the one or more afflicted libraries in relation to the application. For example, a risk score for a direct dependency can be assigned differently from a risk score for a transitive dependency. A higher risk score can indicate a higher chance of a security breach and a lower risk score can indicate a lower chance of a security breach.

In block 712, the risk score of the API is compared to a threshold risk value. The threshold risk value can be assigned according to examples described.

In block 714, a remedial action is made for each afflicted library called by the API in response to the risk score exceeding the threshold risk value. The remedial action can include generating a report including information regarding the afflicted libraries, updating the library versions, and/or reverting the library versions to a backwards compatible version. The remedial actions can be done to either report the presence of a CVE in a library or to resolve the CVE. In some examples, a report can be generated that include the list of afflicted libraries, the risk score of the API, and a notification that a newer version of a library is not backwards compatible. The report can be transmitted to one or more user devices operated by users implementing the application. In some examples, code of a newer version of a library can be compared against code of a current version of the library for each library of the one or more afflicted libraries using a code differentiation tool of the computer system. As a result of the comparison, a determination that the newer version is not backwards compatible with the current version can be made.

V. COMPUTER SYSTEM

Figure 8:
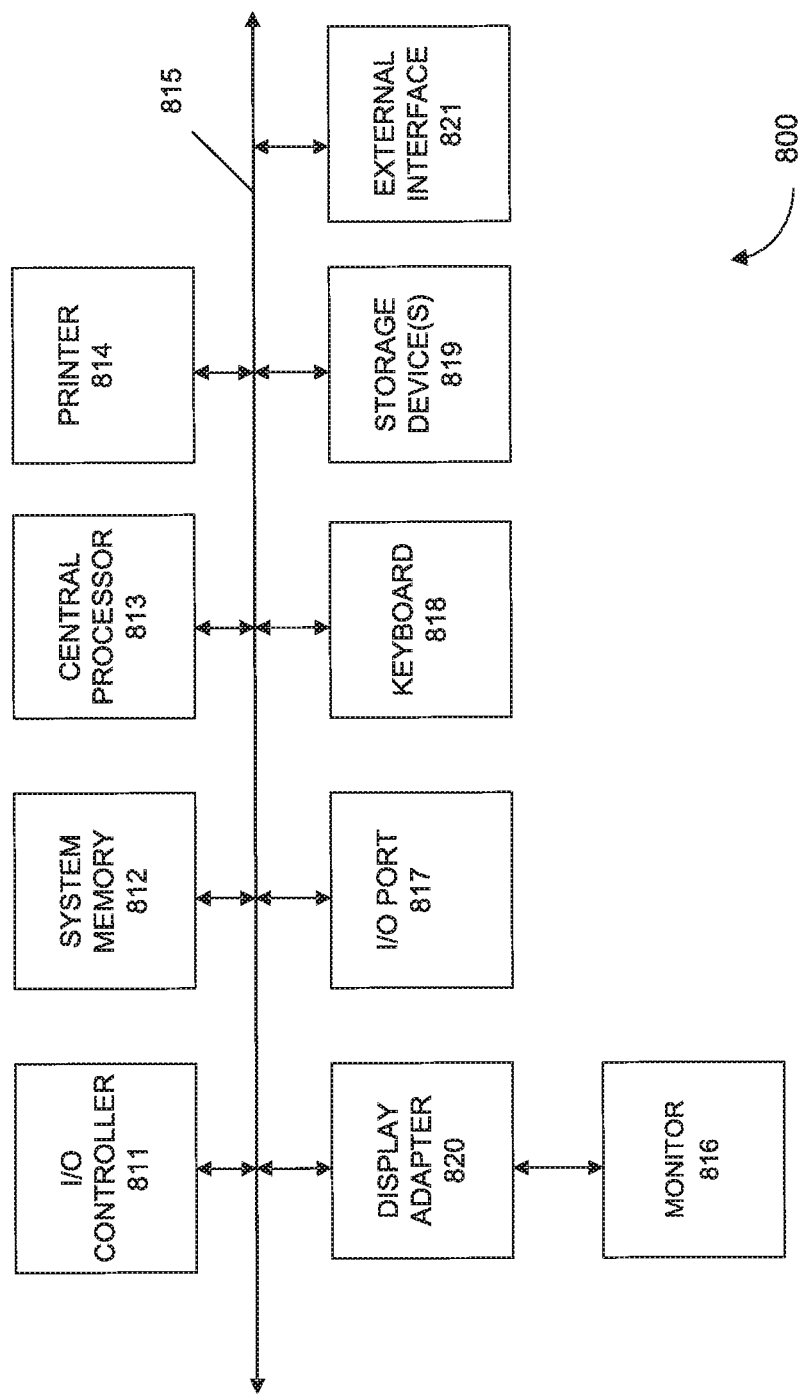
FIG. 8 depicts a block diagram of an example computer system usable with system and methods according to some embodiments of the present invention.

FIG. 8 depicts a block diagram of an example computer system usable with system and methods according to one example.

Any of the computer systems mentioned herein may utilize any suitable number of subsystems. Examples of such subsystems are shown in FIG. 8 in computer apparatus 800. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 815. Additional subsystems such as a printer 814, keyboard 818, storage device(s) 819, monitor 816, which is coupled to display adapter 820, and others are shown. Peripherals and input/output (I/O) devices, which couple to I/O controller 811, can be connected to the computer system by any number of means known in the art such as input/output (I/O) port 817 (e.g., USB, FireWire®). For example, I/O port 817 or external interface 821 (e.g. Ethernet, Wi-Fi, etc.) can be used to connect computer apparatus 800 to a wide area network such as the Internet, a mouse input device, or a scanner. The interconnection via system bus 815 allows the central processor 813 to communicate with each subsystem and to control the execution of instructions from system memory 812 or the storage device(s) 819 (e.g., a fixed disk, such as a hard drive or optical disk), as well as the exchange of information between subsystems. The system memory 812 and/or the storage device(s) 819 may embody a computer readable medium, which may be a non-transitory computer readable medium. Any of the data mentioned herein can be output from one component to another component and can be output to the user.

A computer system can include a set of the same components or subsystems, e.g., connected together by external interface 821 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

VI. REFERENCES

[1] Ibrahim, S., Bashah Idris, N., Munro, M., & Deraman, A. (n.d.). *A REQUIREMENTS TRACEABILITY TO SUPPORT CHANGE IMPACT ANALYSIS.*
[2] Brito, A., Xavier, L., Hora, A., & Valente, M. T. (2018). *Why and how Java developers break APIs.* 2018 IEEE 25th International Conference on Software Analysis, Evolution and Reengineering (SANER). doi:10.1109/saner.2018.8330214
[3] Fenton, C. (2017, Oct. 3). *How to Check Open Source Code for Vulnerabilities*—DZone Security. Retrieved from https://dzone.com/articles/how-to-check-open-source-code-for-vulnerabilities.

What is claimed is:

1. A method for securing vulnerabilities in a software package, the method comprising performing, by a computer system:
    receiving a set of libraries corresponding to third-party software used by the software package;
    storing, in a database of the computer system, a uniform resource identifier ("URI") for each library within the set of libraries;
    searching, by the computer system, a public domain for newer versions of each library of a list of afflicted libraries based on the URI for each library;
    determining the list of afflicted libraries from the set of libraries, wherein each library of the list of afflicted libraries is affected by a vulnerability;
    determining one or more afflicted libraries from the list of afflicted libraries upon which an application of the software package depends, wherein the application executes code from the one or more afflicted libraries, and wherein the application calls the one or more afflicted libraries;
    identifying, for each library of the one or more afflicted libraries in the list of afflicted libraries, a number of code calls that include the vulnerability, where a code call is made by an application program interface (API) of the application of the software package, and wherein the code calls are made to code within each library of the one or more afflicted libraries;
    assigning a risk score to the API based on the number of code calls;
    comparing the risk score of the API to a threshold risk value; and causing a remedial action for each afflicted library called by the API in response to the risk score exceeding the threshold risk value.

2. The method of claim 1, further comprising:
storing, in the database, release notes and changelogs associated with the newer versions; and
wherein the searching of the public domain is performed using a web crawler implemented by the computer system.

3. The method of claim 1, further comprising:
analyzing release notes and changelogs using a natural language processor engine of the computing system to determine one or more fixable libraries from the list of afflicted libraries, wherein a newer version of a fixable library removes or reduces an impact of the vulnerability in a current version of the fixable library,
wherein the remedial action includes updating the current version of the fixable library to the newer version of the fixable library.

4. The method of claim 1, further comprising:
comparing, using a code differentiation tool of the computer system, code of a newer version of a library against code of a current version of the library for each library of the one or more afflicted libraries; and
determining, in response to the comparison by the code differentiation tool, that the newer version is not backwards compatible with the current version.

5. The method of claim 4, further comprising:
generating a report including the list of afflicted libraries, the risk score of the API, and a notification that the newer version is not backwards compatible; and
transmitting the report to one or more user devices operated by users implementing the application.

6. The method of claim 1, wherein assigning the risk score includes determining a dependency relationship of each library from the one or more afflicted libraries in relation to the application, wherein a risk score for a direct dependency is assigned differently from a risk score for a transitive dependency.

7. The method of claim 1, wherein a higher risk score indicates a higher chance of a security breach and a lower risk score indicates a lower chance of the security breach.

8. A non-transitory computer-readable medium comprising instructions that are executable by a processing device for causing the processing device to:
receive a set of libraries corresponding to third-party software used by a software package;
store a uniform resource identifier ("URI") for each library within the set of libraries;
search a public domain for newer versions of each library of a list of afflicted libraries based on the URI for each library;
determine the list of afflicted libraries from the set of libraries, wherein each library of the list of afflicted libraries is affected by a vulnerability;
determine one or more afflicted libraries from the list of afflicted libraries upon which an application of the software package depends, wherein the application executes code from the one or more afflicted libraries, and wherein the application calls the one or more afflicted libraries;
identify, for each library of the one or more afflicted libraries in the list of afflicted libraries, a number of code calls that include the vulnerability, where a code call is made by an application program interface (API) of the application of the software package, and wherein the code calls are made to code within each library of the one or more afflicted libraries;
assign a risk score to the API based on the number of code calls;
compare the risk score of the API to a threshold risk value; and
cause a remedial action for each afflicted library called by the API in response to the risk score exceeding the threshold risk value.

9. The non-transitory computer-readable medium of claim 8 further comprising instructions that are executable by the processing device to:
store release notes and changelogs associated with the newer versions, wherein the search of the public domain is performed using a web crawler.

10. The non-transitory computer-readable medium of claim 8 further comprising instructions that are executable by the processing device to:
analyze release notes and changelogs using a natural language processor to determine one or more fixable libraries from the list of afflicted libraries, wherein a newer version of a fixable library removes or reduces an impact of the vulnerability in a current version of the fixable library,
wherein the remedial action includes updating the current version of the fixable library to the newer version of the fixable library.

11. The non-transitory computer-readable medium of claim 8 further comprising instructions that are executable by the processing device to:
compare, using a code differentiation tool, code of a newer version of a library against code of a current version of the library for each library of the one or more afflicted libraries; and
determine, in response to the comparison by the code differentiation tool, that the newer version is not backwards compatible with the current version.

12. The non-transitory computer-readable medium of claim 11 further comprising instructions that are executable by the processing device to:
generate a report including the list of afflicted libraries, the risk score of the API, and a notification that the newer version is not backwards compatible; and
transmit the report to one or more user devices operated by users implementing the application.

13. The non-transitory computer-readable medium of claim 8 wherein a higher risk score indicates a higher chance of a security breach and a lower risk score indicates a lower chance of the security breach.

14. The non-transitory computer-readable medium of claim 8 wherein assigning the risk score includes determining a dependency relationship of each library from the one or more afflicted libraries in relation to the application, wherein a risk score for a direct dependency is assigned differently from a risk score for a transitive dependency.

15. A system comprising:
a processing device,
a communications port, and
a non-transitory computer-readable medium comprising instructions that are executable by the processing device to:
receive, by the communication port, a set of libraries corresponding to third-party software used by a software package;
store a uniform resource identifier ("URI") for each library within the set of libraries;

search a public domain for newer versions of each library of a list of afflicted libraries based on the URI for each library;

determine the list of afflicted libraries from the set of libraries, wherein each library of the list of afflicted libraries is affected by a vulnerability;

determine one or more afflicted libraries from the list of afflicted libraries upon which an application of the software package depends, wherein the application executes code from the one or more afflicted libraries, and wherein the application calls the one or more afflicted libraries;

identify, for each library of the one or more afflicted libraries in the list of afflicted libraries, a number of code calls that include the vulnerability, where a code call is made by an application program interface (API) of the application of the software package, and wherein the code calls are made to code within each library of the one or more afflicted libraries;

assign a risk score to the API based on the number of code calls;

compare the risk score of the API to a threshold risk value; and cause a remedial action for each afflicted library called by the API in response to the risk score exceeding the threshold risk value.

16. The system of claim 15, the non-transitory computer-readable medium further comprising instructions that are executable by the processing device to:

store release notes and changelogs associated with the newer versions, wherein the search of the public domain is performed using a web crawler.

17. The system of claim 15, the non-transitory computer-readable medium further comprising instructions that are executable by the processing device to:

analyze release notes and changelogs using a natural language processor engine to determine one or more fixable libraries from the list of afflicted libraries, wherein a newer version of a fixable library removes or reduces an impact of the vulnerability in a current version of the fixable library, wherein the remedial action includes updating the current version of the fixable library to the newer version of the fixable library.

18. The system of claim 15, the non-transitory computer-readable medium further comprising instructions that are executable by the processing device to:

compare, using a code differentiation tool, code of a newer version of a library against code of a current version of the library for each library of the one or more afflicted libraries; and determine, in response to the comparison by the code differentiation tool, that the newer version is not backwards compatible with the current version.

19. The system of claim 18, the non-transitory computer-readable medium further comprising instructions that are executable by the processing device to:

generate a report including the list of afflicted libraries, the risk score of the API, and a notification that the newer version is not backwards compatible; and transmit the report to one or more user devices operated by users implementing the application.

20. The system of claim 15, wherein assigning the risk score includes determining a dependency relationship of each library from the one or more afflicted libraries in relation to the application, wherein a risk score for a direct dependency is assigned differently from a risk score for a transitive dependency.

* * * * *